United States Patent [19]
Galfidi, Jr.

[11] Patent Number: 5,964,054
[45] Date of Patent: Oct. 12, 1999

[54] GAME CALLER

[76] Inventor: Joe Galfidi, Jr., 8738 Tyler Blvd., Mentor, Ohio 44060

[21] Appl. No.: 09/002,688

[22] Filed: Jan. 5, 1998

Related U.S. Application Data

[63] Continuation-in-part of application No. 08/637,502, Apr. 25, 1996, Pat. No. 5,704,154.

[51] Int. Cl.$^6$ ........................................ A63H 5/00
[52] U.S. Cl. ................................ 42/90; 446/302; 446/397
[58] Field of Search .................................... 446/202, 203, 446/207, 208, 397, 192, 193, 297, 302; 42/90

[56] References Cited

U.S. PATENT DOCUMENTS

| | | | |
|---|---|---|---|
| 4,791,741 | 12/1988 | Kondo | 369/64 |
| 4,936,780 | 6/1990 | Cogliano | 446/397 |
| 5,239,587 | 8/1993 | Muckelrath | 381/56 |
| 5,419,304 | 5/1995 | Pardue | 446/397 |
| 5,431,590 | 7/1995 | Abbas | 446/397 |
| 5,802,197 | 9/1998 | Fulcher | 446/397 |

*Primary Examiner*—Stephen M. Johnson
*Attorney, Agent, or Firm*—Joseph H. Taddeo

[57] ABSTRACT

This present invention relates to apparatus for use in hunting wild game animals and waterfowl, and more particularly to a weapon mounted wild animal game caller. This weapon mounted wild animal game caller finds particular application in attracting deer. It may be conveniently mounted and attached to an archery bow or to a hunting firearm. The game caller emits a grunting sound which is know to attract game animals, such as deer. The use of the grunter is very desirable for short range hunting making it the choice for many bow hunters. The activation of sound is accomplished by a novel air bladder that is filled with a resilient filamentous polyester type fiber. When mounted to an archers bow, it is easily operated with the hand even with a fully drawn bow. In an alternative embodiment, the game caller uses an electronic recording system to store a plurality of prerecorded calls, such as deer, geese, duck and the like. The recording media may be either a magnetic tape recorder or a digital synthesizer having a plurality of game calls that are stored in digital memory. The entire game calling system can be worn on one's belt and activated silently by depressing a bow mounted or stock mounted switch.

15 Claims, 8 Drawing Sheets

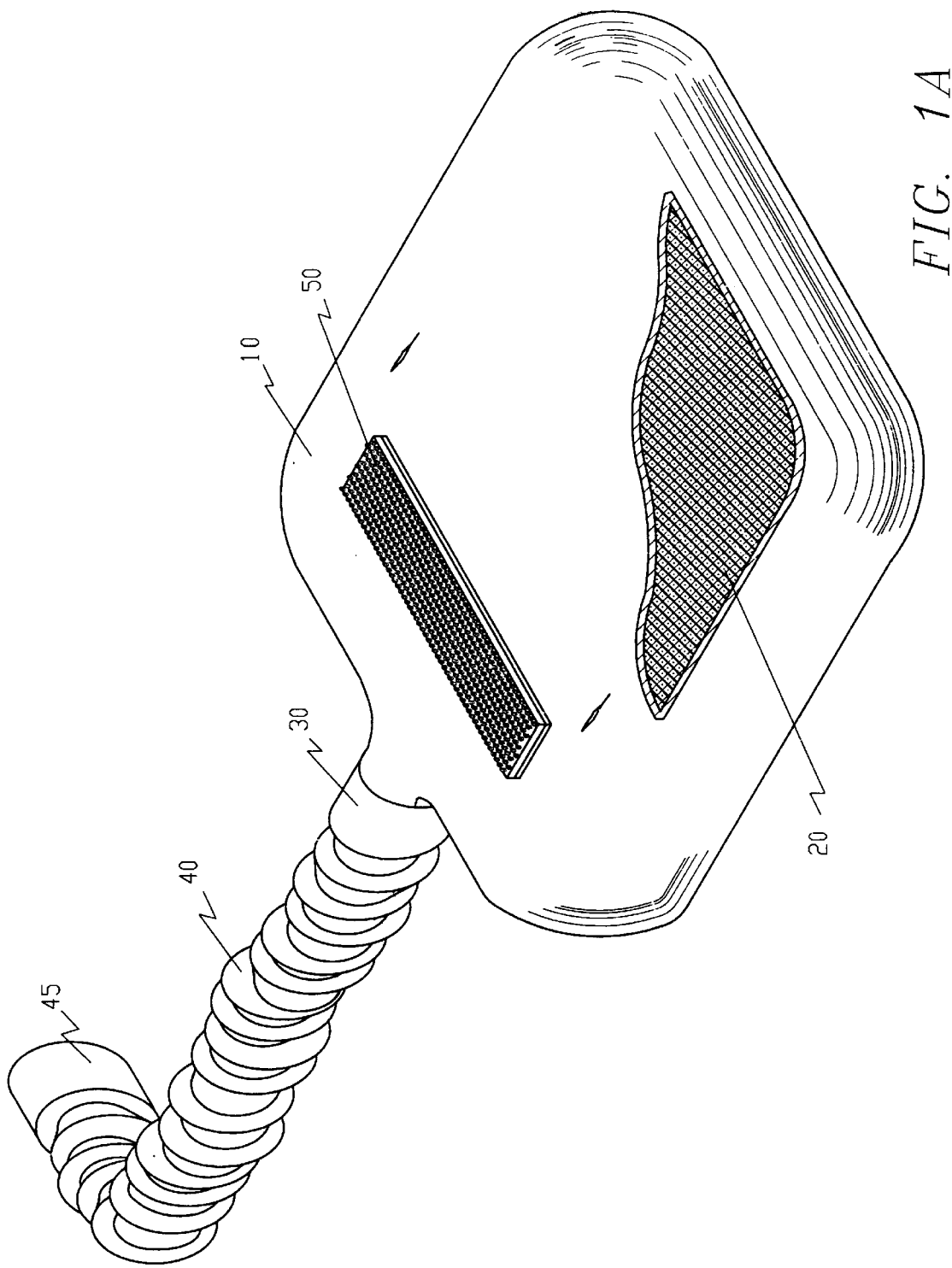

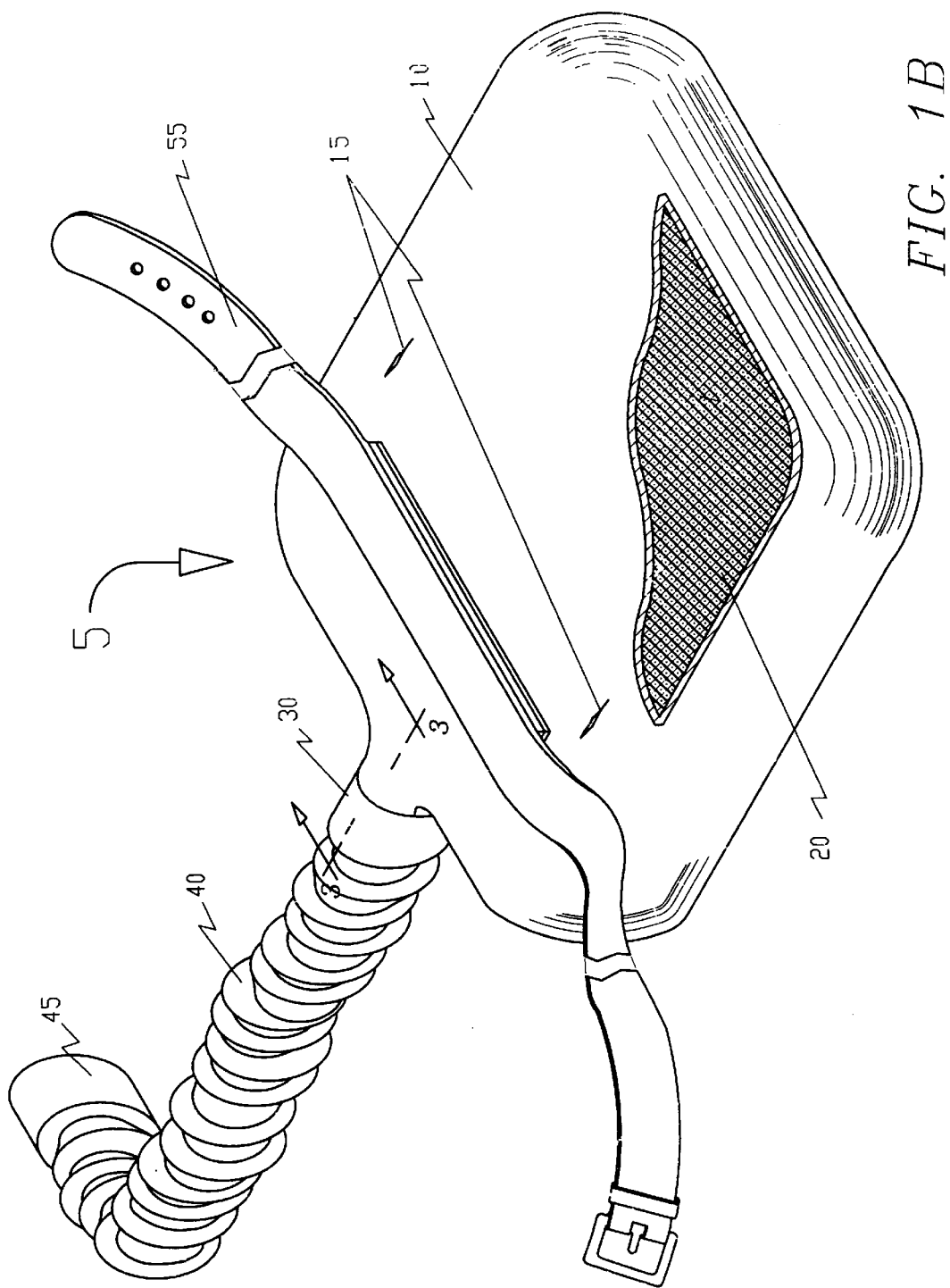

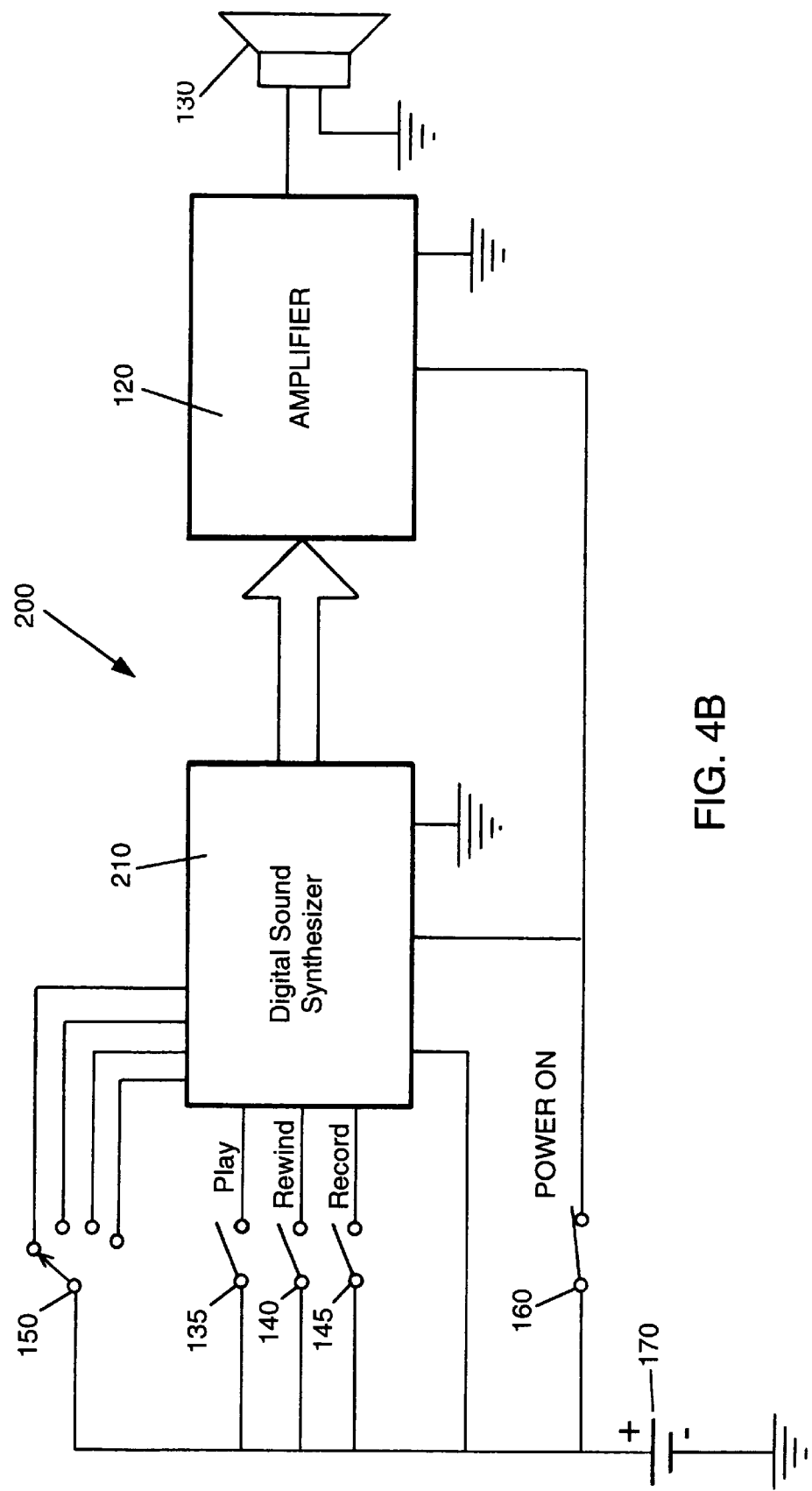

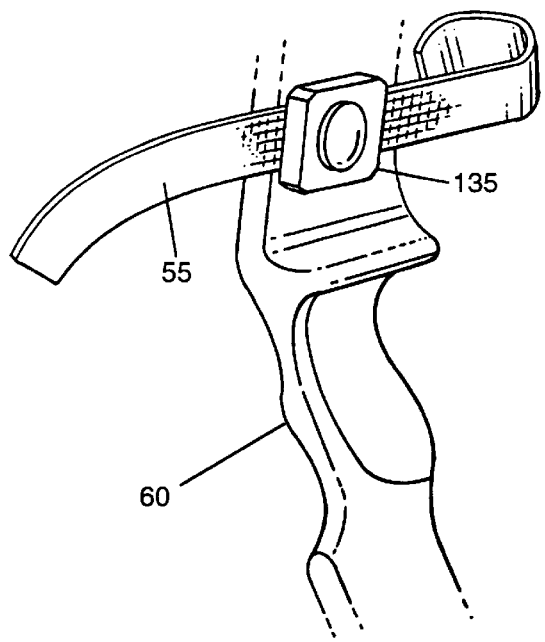 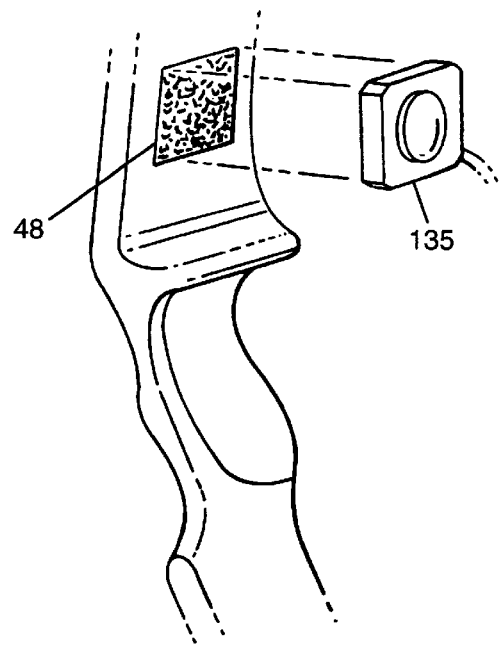
FIG. 5A  FIG. 5B
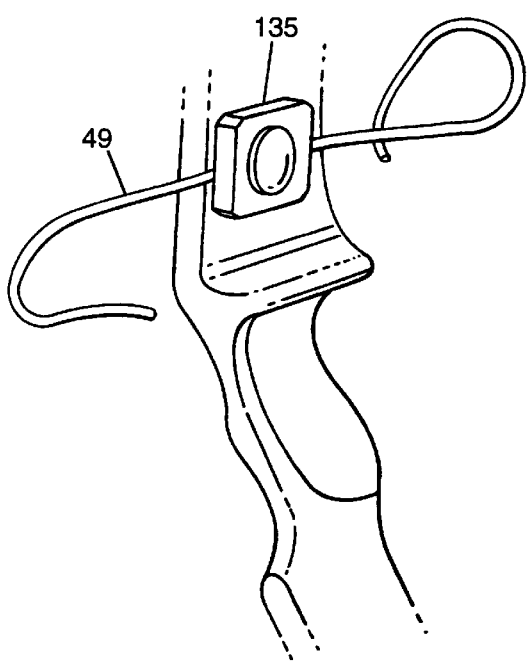 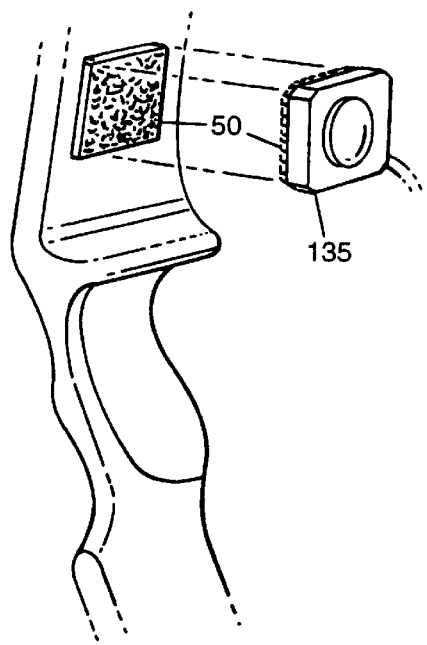
FIG. 5C  FIG. 5D

GAME CALLER

REFERENCE TO PREVIOUSLY FILED APPLICATIONS

This application is a continuation-in-part of the prior Patent Application of Joe Galfidi, Jr., identified by Ser. No. 08/637,502, Titled A WEAPON MOUNTED GAME CALLER, filed Apr. 25, 1996, now U.S. Pat. No. 5,704,154. Benefit of the filing date for original disclosure material in the parent domestic application is claimed under 35 USC 120 and 37 CFR §1.53.

FIELD OF INVENTION

The present invention relates to apparatus for use in hunting wild game animals and waterfowl, and more particularly to a weapon mounted wild animal game caller. This weapon mounted wild animal game caller finds particular application in attracting deer. It may be conveniently mounted and attached to an archery bow, crossbow or to a hunting firearm.

BACKGROUND OF THE INVENTION

There are many devices in use today to attract wild game animals. Typically, these wild game animals include deer, moose, elk, wild fowl and waterfowl, or even turkeys. These devices that produce sound to attract the wild game are often referred to as game callers. Rattling horns, both large and small are commonly used to create sounds that will attract deer.

Large horns have one major advantage—volume. They can be heard for long distances, or in thick cover. However, they also have disadvantages, mostly in carrying them around. Horns can be hung on a thong looped around the hunter's neck, but large antlers clatter on everything else that is carried from binoculars to a rifle. They can also present a safety problem, since there are people in the woods who will shoot at horns regardless of what neck they're hanging from. For this reason some hunters paint their horns hunter orange.

Deer can hear small horns at surprising distances. The hunter need only to "tickle" the small horns several times to attract deer. Some bow hunters rattle an aluminum arrow against the wooden riser of the bow to call in bucks. Still other hunters use "rattling bags," small bags full of bone chips or other hard material, that simulate the light ticking of tines. They can be worked with one hand, with very little movement.

Still, many other hunters prefer a grunt call for close work, partially because it provides another type of sound. Unlike a rattling bag, a small grunt call doesn't even need one hand to work, leaving both hands free for your rifle or bow. Many calls are mouth-operated by blowing into them. Some calls require hunters to grunt vocally with their throats as they blow into the caller.

Sometimes it helps to provide other sound effects. Some of these devices are treadle operated by stepping on them with ones foot.

U.S. Pat. No. 4,237,615, granted Dec. 9, 1980, P. A. Bracknell, discloses a sight mount for an archery bow embodying a bracket to be mounted upon a bow.

U.S. Pat. No. 5,123,396, granted Jan. 23, 1992, to P. Shepley, et al., teaches of an accessory mount for a removable rigid securement of an accessory to an archery bow. The accessory mount provides for the mounting of a quiver to store more arrows, an overdraw mechanism or a sight.

U.S. Pat. No. 5,419,304, granted May 30, 1995, to R. K. Pardue, discloses a mounting jig that is removable and coupleable to a hunting bow, adapted to receive a removable turkey caller.

U.S. Pat. No. 5,431,590, granted Jul. 11, 1995, to F. M. Abbas, discloses an apparatus for calling game animals when the user is hunting with an archery bow. A game attracting call is sounded when the user either draws or blows air through a conduit which is connected to the bow mounted game caller.

There are many problems associated with using the apparatus described. Many of the devices require two hands to operate the device; some only one hand. There are calls that must be held in the mouth which can cause fatigue to the hunter holding the device. Foot operated apparatus is awkward at best, therefore does not find much application in deer hunting. Others may emit undesirable sounds at inappropriate times, thereby "spooking" the prey. The nature of the hunt requires that a bow hunter will be able to silently operate the caller device even with a fully drawn bow.

What is needed is a small, lightweight, reliably operated caller that can be mounted to a hunting weapon, such as to a hunting bow or firearm, to attract deer and other wild game. In this regard, this invention fulfills this need.

SUMMARY OF THE INVENTION

The present invention is a pressure operated apparatus for attracting by calling game animals, such as deer, moose and elk while hunting with a bow. Its use is not limited to mounting or attaching to an archery bow, but can find application in mounting to a firearm as well.

The game attractor consists of a grunter that is made to be sounded by blowing air through a conduit, past a reed that vibrates, creating a simulated deer grunting sound. Using a caller in this manner, which is attachable to the hunter's bow, crossbow or firearm, frees the arms and hands of the archer to sound the device while holding a drawn bow.

An air bladder, fabricated from a sheet vinyl material, attached to the sounding device, serves as an air bladder that when squeezed or compressed, forces the air through the caller and across the reed. Internal to the jacketed bladder is a cushioning material comprised of a resilient filamentous polyester type fiber that restores the bladder to its original shape, while allowing air to be again silently filling the bladder for its next compression.

There are no extraneous noises produced by the compression of the vinyl bladder or the resilient polyester fiber. Silent operation is essential to prevent scaring away the prey. Even the vinyl air bladder is designed to be free from emitting noise, even if inadvertently rubbed by ones jacket or by a hunting shaft. The vinyl material selected is both soft and pliable and has a rapid recovery to its original shape even during the cooler autumn months.

The air bladder driven grunter can be mounted near the central portion of the bow where it can be operated by slight pressure exerted by the archer's hand. It can be secured by a hook and pile attachment system (Velcro) or by plastic thongs.

It is therefore an object of this invention to provide for a wild game caller that is driven by an air bladder system.

It is another object of this invention to provide for a wild game caller that is driven by an air bladder system, said air bladder being filled with a highly resilient, rapid recovery polyester fiber.

It is still another object of this invention to provide for a wild game caller that is driven by an air bladder system, said air bladder being comprised of materials that is free from inadvertently generating any extraneous sounds that are distracting to the prey.

Yet, it is still another object of this invention to provide for a wild game caller system that is attached to an archery bow by using hook and loop securing device.

Further, it is another object of this invention to provide for a wild game caller system that is attached to a hunter's firearm by using hook and loop securing device.

Lastly, it is another object of this invention to provide for a wild game caller system that is easily operated by the bowman even with the bow being fully drawn.

BRIEF DESCRIPTION OF THE DRAWINGS

FIG. 1a is a perspective drawing of the air bladder driven grunter system detailing a cutaway portion showing the resilient polyester fiber.

FIG. 1b is a perspective drawing of the air bladder driven grunter system detailing a cutaway portion, showing the resilient polyester fiber, and the Velcro laden strap attachments.

FIG. 4b is a block diagram of a portable belt mounted electronic game caller using a digital synthesizer having selectable calls stored in digital memory.

FIG. 5A is a side perspective showing an archery bow with the actuator mounted thereon by means of a strap with VELCRO.

FIG. 5B is a side perspective of an archery bow having a pressure sensitive adhesive thereon with the actuator in readiness for mounting on the bow using the pressure sensitive adhesive.

FIG. 5C is a side perspective of an archery bow with the actuator mounted thereon by means of thongs.

FIG. 5D is a side perspective of an archery bow having a hook and loop material for mounting the actuator directly on the bow with the actuator in readiness for mounting thereon.

DESCRIPTION OF THE PREFERRED EMBODIMENTS

Figures 2A, 2B:
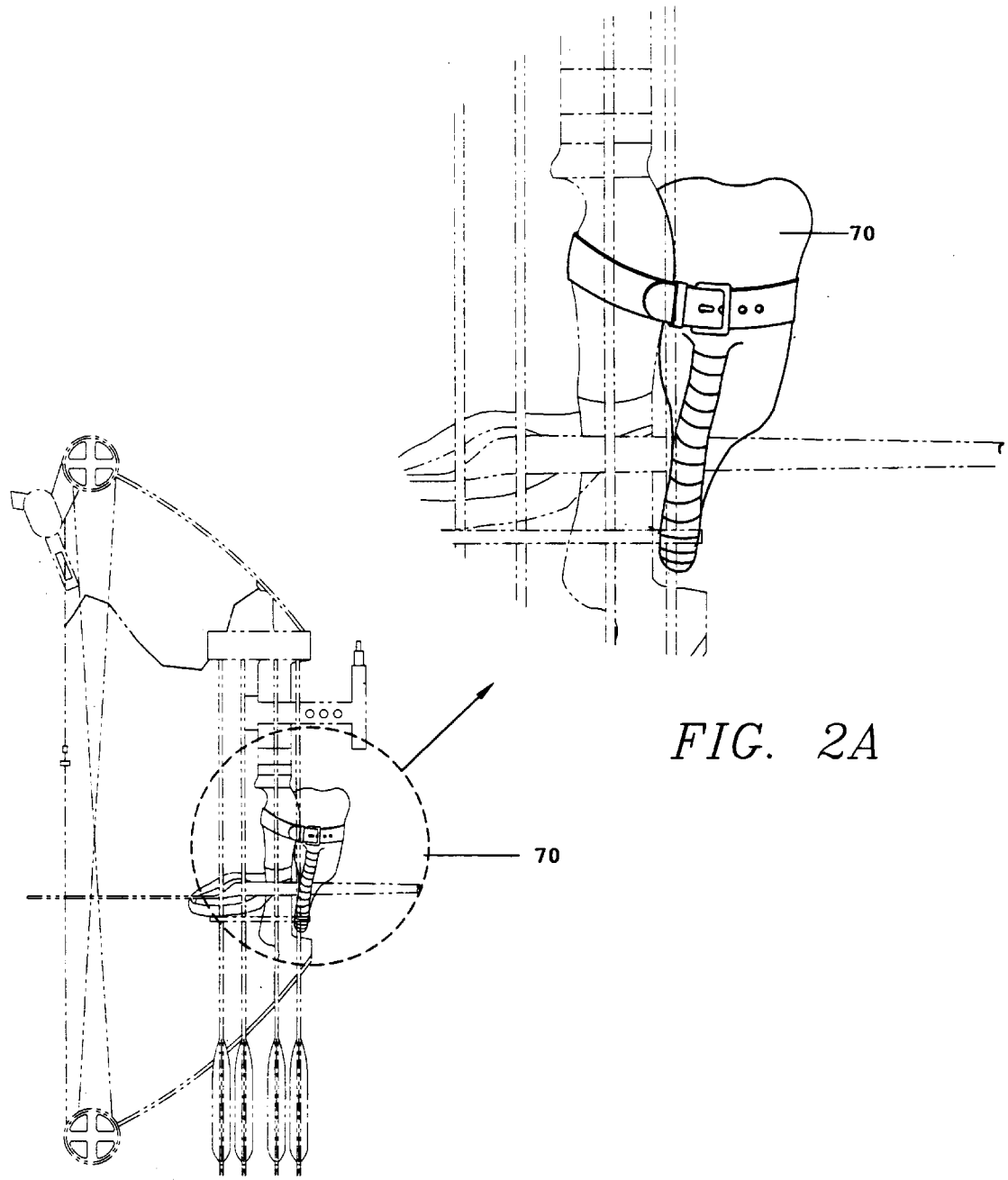
FIG. 2a is a close-up side elevational view of an archery bow showing the preferred mounting area of the air bladder driven grunter.
FIG. 2b is a side elevational view of an archery bow showing the preferred mounting area of the air bladder driven grunter.
Figure 3:
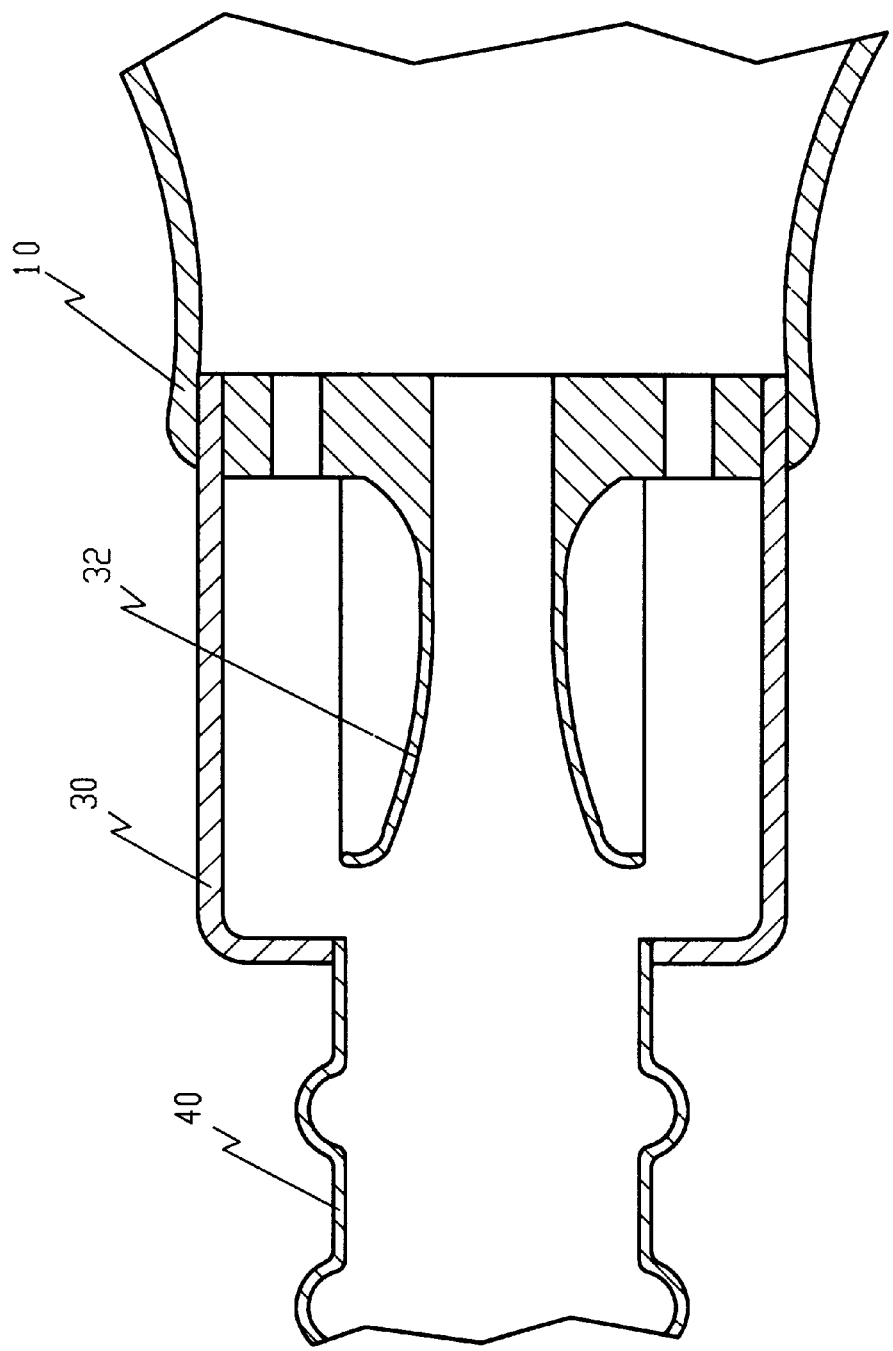
FIG. 3 is a side elevational view of the grunter with its encased reed.

Presently available grunters are designed to be sounded by blowing air or by drawing air across the reed found internal to the nylon grunter. Present callers retained on a hunter's neck or jacket require movements with potential rustling noises for use. This type of design is awkward and cumbersome especially to the hunter that is using an archery bow to hunt with. Grunters which are clamped by a hunter's teeth may interfere with aiming and firing techniques. Even though the bowman's hands are free to draw the bow, it is quite fatiguing to hold a grunter in one's mouth by clenching ones' teeth.

FIG. 1a is a perspective drawing of the invention 5, which shows the air bladder driven grunter in its preferred embodiment. The present invention uses a vinyl air bladder 10 as the source of air to operate the grunter. The air bladder comprises an exterior jacket which is made of a soft pliable vinyl material. The bladder is preferably filled with a material which is shredded or fragmented, so that there are interstitial air-filled spaces between the shreds. More preferably, that material is a resilient filamentous polyester type fiber 20. This material having interstices between the fibers is selected to have a rapid recovery of shape after once being squeezed or compressed. A further selection criterion for the air bladder and polyester fiber is that they emit no undesirable noises when in use.

When the air bladder is controllably depressed, as a bowman would do by exerting a force with the hand, there is a passage of air through the nylon grunter 30. Internal to the grunter is a reed which is set into vibration when a volume of air passes across it. It is the size and shape of the vibrating reed that gives it the grunting capability when short bursts of air are passed through it.

The sound that is created by the vibrating reed then passes through a flexible nylon conduit 40 that gives an added dimension to the authenticity of the grunting sound.

Upon the release of pressure on the air bladder, there is a rapid recovery to the shape of the air bladder. As the original shape is restored, air is now drawn in through the acoustic nylon conduit 40, then silently passing through the nylon grunter 30, into the now fully expanded air bladder. Slits 15, that are cut through the bladder jacket, increase the rate at which the bladder recovers and refills with air.

The air bladder driven grunter can be attached to an archery bow by tethering if to the bow or by securing it with a hook and pile Velcro device 50. As shown in FIG. 1b, the grunter can also be attached to the weapon by means of a strap or belt 55, which is adhered to the bladder jacket and extends around the bow or firearm. The strap or belt 55 is laden with Velcro 50 for mating the strap ends to mount the grunter on the weapon with the desired tightness and security.

Turning now to FIG. 2b, shown is a side elevational view of an archery bow 60 with the air bladder driven grunter 70 mounted to it. The grunter assembly 70 is mounted in a convenient position so that it can be easily operated even with a fully drawn bow.

FIG. 2a is an expanded side view of the central portion of the bow showing the preferred placement of air bladder driven grunter assembly 70.

Figure 4A:
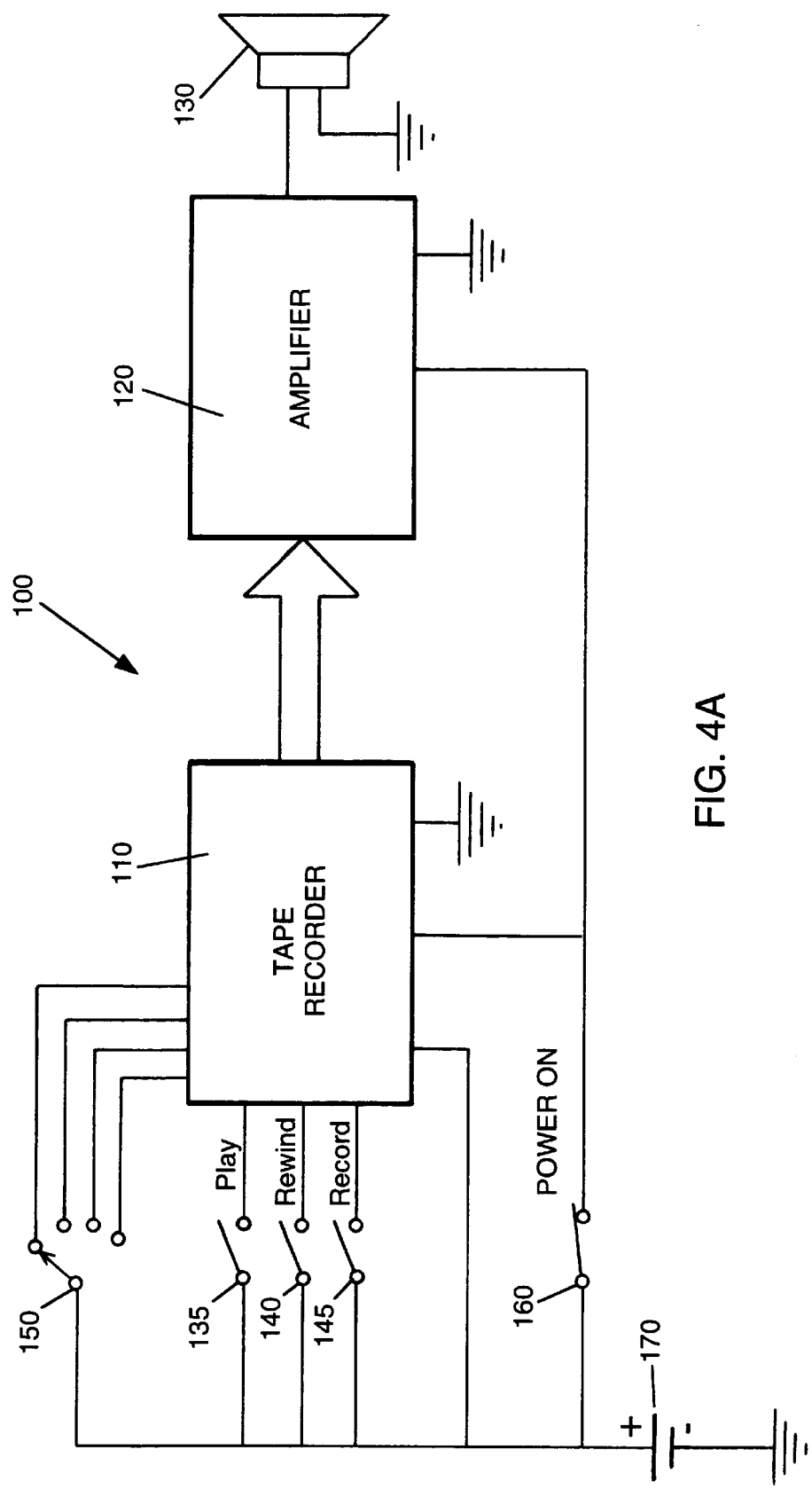
FIG. 4a is a block diagram of a portable belt mounted electronic game caller having selectable calls using an analog tape recording.

Illustrated in FIG. 4a is a block diagram of a first alternative embodiment of a portable game caller. The electronic game caller 100 is comprised of tape recorder 110, amplifier 120 and loud speaker 130. A battery 170 supplies the necessary power to give portable operation to the calling system.

Switch 160 is the "power on" switch for the entire system. Switch 140 and 145 provide the rewind and record functions respectively. Different game calls, such as deer grunting, geese calls or duck calls, and the like, are selected by using switch 150 to position the tape drive according to the recorded index markings that are recorded on the tape (not shown) to the selected portion of the tape that corresponds to the preprogrammed switch positions.

Figure 5E:
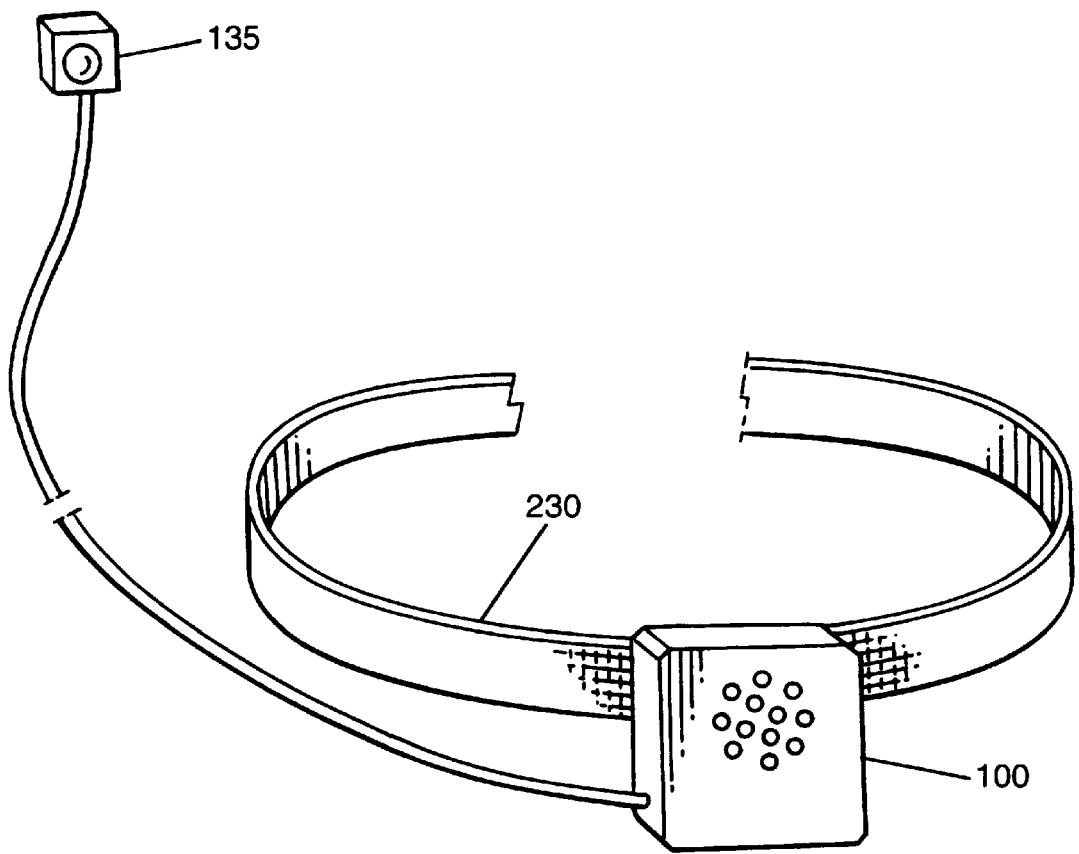
FIG. 5E is a perspective view showing the actuator on the circuit of the belt mounted electronic game caller.

In typical use, when one operates the system, the actuator switch 135 is mounted on the archery bow or rifle stock so that it can be conveniently depressed with one's thumb or forefinger. Momentarily depressing this switch 135 initiates the playback sequence, where the pre-selected sound is emitted from the wideband loudspeaker 130. Upon completion of emitting the prerecorded call, the tape is automatically rewound to its index starting position, and is ready to give another call. As shown in FIGS. 5A to 5D, the actuator switch 135 can be mounted to the bow by means of a belt having VELCRO 55, a pressure sensitive adhesive 48 on the bow, by means of thongs 49, or VELCRO 50 on the bow. The game caller 100 is belt mounted as shown in FIG. 5E.

One advantage in using this electronic game calling innovation is that there are no inadvertent noises made that may "spook" the prey.

As shown in FIG. 4b, is a block diagram of a second alternative embodiment of the portable electronic game caller 200. The diagram is essentially the same as in the first alternative embodiment except for the use of a digital sound synthesizer 210, with a digital memory that stores a plurality of game calls in digital memory. The principle advantages in using this system is that it can rewind virtually instantaneously, has no tape rewinding sounds emitted and is more efficient in operation, using less battery power.

There may be other improvements, modifications and embodiments that will become apparent to one of ordinary skill in the art upon review of this disclosure. As such, these improvements, modifications and embodiments are considered to be within the scope of this invention as defined in the claims and equivalents thereof.

I claim:

1. A portable electronic game call device for use with an archery bow to attract game animals, comprising:

a circuit with an independent power source and an electronic caller, the caller including play, rewind and record functions and an actuator for initiating a game call;

wherein the electronic caller is mounted on a hunter's belt; and, the bow having a central portion, the actuator mounted at the central portion for sounding the caller while the bow is being aimed and fired; and, means for mounting the actuator to the bow.

2. The portable electronic call device according to claim 1, the caller comprising a digital sound synthesizer with a digital memory and a plurality of calls stored in the memory, an amplifier and a speaker for operation of the electronic game call device.

3. The portable electronic call device according to claim 2, further comprising a power switch for the circuit to turn the device off for power conservation when the electronic call is not in use.

4. The portable electronic call device according to claim 3, the actuator comprising an action switch to initiate a game call from the speaker.

5. The portable electronic call device according to claim 4, the plurality of calls that are prerecorded and stored in digital memory, selected from the group consisting of deer grunting, moose grunting, geese calls, duck calls, pheasant calls, turkey calls and bird calls.

6. The portable electronic call device according to claim 5, further comprising a selector switch for playing a selected synthesizer preprogrammed call.

7. The portable electronic call device according to claim 6, wherein the synthesizer includes an instantaneous reset after sounding a synthesizer preprogrammed call, that emits no sounds upon resetting thereof.

8. The portable electronic call device according to claim 1, wherein the means for mounting the actuator comprises a pressure sensitive adhesive.

9. The portable electronic call device according to claim 1, wherein means for mounting the actuator comprises a hook and loop securing arrangement.

10. The portable electronic call device according to claim 9, wherein the hook and loop securing arrangement comprises VELCRO.

11. The portable electronic call device according to claim 1, wherein the means for mounting comprises a belt having two ends, the belt adhered to the bow and extending around the bow, the belt laden with VELCRO material for securing the actuator to the bow with a tight connection.

12. The portable electronic call device according to claim 10, wherein the means for mounting the actuator comprises thongs for tethering the actuator to the bow.

13. The portable electronic game call device according to claim 1, the caller comprising a tape recorder including a tape drive and a prerecorded tape having a plurality of different game calls and index markings recorded on the tape, and a game call selector switch to position the prerecorded tape at the index markings to initiate a playback sequence of a selected portion of the tape respective to each of the game calls, an amplifier and a wide band loud speaker for operation of the electronic game call to emit a preselected game call chosen from the plurality.

14. The portable electronic game call device according to claim 13, further comprising a means for automatic rewind of the tape, whereby upon completion of emitting a prerecorded call the tape is automatically rewound to its index starting position in readiness to provide another call.

15. The portable electronic call device according to claim 14, the plurality of different game calls selected from the group consisting of deer grunting, moose grunting, geese calls, duck calls, pheasant calls, turkey calls and bird calls.

* * * * *